US009647911B1

(12) United States Patent
Taylor et al.

(10) Patent No.: US 9,647,911 B1
(45) Date of Patent: May 9, 2017

(54) TRACKING NETWORK DATA PROPAGATION

(71) Applicant: digitalQpon, Inc., Newport Beach, CA (US)

(72) Inventors: Paul A. Taylor, Newport Beach, CA (US); Munish Madan, Calgary (CA)

(73) Assignee: DIGITAL QPON INC., Newport Beach, CA (US)

( * ) Notice: Subject to any disclaimer, the term of this patent is extended or adjusted under 35 U.S.C. 154(b) by 117 days.

(21) Appl. No.: 14/812,322

(22) Filed: Jul. 29, 2015

Related U.S. Application Data

(60) Provisional application No. 62/031,035, filed on Jul. 30, 2014, provisional application No. 62/129,703, filed on Mar. 6, 2015, provisional application No. 62/156,574, filed on May 4, 2015.

(51) Int. Cl.
*G06F 15/173* (2006.01)
*H04L 12/26* (2006.01)

(52) U.S. Cl.
CPC .............. *H04L 43/08* (2013.01); *H04L 43/10* (2013.01)

(58) Field of Classification Search
None
See application file for complete search history.

(56) References Cited

U.S. PATENT DOCUMENTS 6,862,575 B1   3/2005   Anttila et al.
8,214,487 B2 *  7/2012   Savoor ................... G06Q 50/06
                                                       370/252
2005/0131761 A1   6/2005   Trika et al.
2011/0184792 A1   7/2011   Butcher et al.
2012/0303435 A1  11/2012   Rawat et al.
2013/0006738 A1   1/2013   Horvitz et al.
(Continued)

FOREIGN PATENT DOCUMENTS

TW         2012-48533         12/2012

OTHER PUBLICATIONS

Hertz Coupon. Hertz Coupon Value Increases with Facebook Shares. http://www.chiefmarketer.com/hertz-coupon-value-increases-with-facebook-shares/, posted Apr. 18, 2012 in 1 page.

(Continued)

*Primary Examiner* — Mohamed Ibrahim
(74) *Attorney, Agent, or Firm* — Knobbe Martens; Scott Raevsky

(57) ABSTRACT

This disclosure describes at least embodiments of a system for electronically generating data and then tracking propagation of the data across a network of devices using computational analysis of communication activity. The network of devices can include a network of one or more servers, end user computing devices, telecommunications infrastructure, and the like, or a subpart thereof. The system can electronically generate, using electronic hardware, generate data items having a variable quantity associated with them that depends at least on a predetermined quantity of those data items as specified by one or more devices in the network of devices, and which may vary based on the communication activities of one or more devices within the network of devices. An individual data item may include a data structure or representation and may be electronically transmitted within the network.

12 Claims, 6 Drawing Sheets

(56) References Cited

U.S. PATENT DOCUMENTS

| | | | |
|---|---|---|---|
| 2013/0036169 A1* | 2/2013 | Quigley | G06Q 50/01 709/204 |
| 2013/0211892 A1 | 8/2013 | Frohwein et al. | |
| 2013/0246138 A1 | 9/2013 | Johnson et al. | |
| 2013/0282455 A1 | 10/2013 | Houseworth et al. | |
| 2013/0311565 A1* | 11/2013 | Barry | H04L 67/22 709/204 |
| 2014/0012654 A1 | 1/2014 | Stewart et al. | |
| 2014/0039995 A1 | 2/2014 | Ngo et al. | |
| 2014/0164079 A1 | 6/2014 | Tapley et al. | |
| 2014/0164082 A1 | 6/2014 | Sun et al. | |
| 2014/0222555 A1 | 8/2014 | Dass | |
| 2015/0088630 A1 | 3/2015 | Taylor et al. | |
| 2015/0095127 A1 | 4/2015 | Patel et al. | |
| 2015/0106183 A1 | 4/2015 | McEvilly et al. | |
| 2016/0080486 A1* | 3/2016 | Ram | H04W 4/023 709/205 |

OTHER PUBLICATIONS

Hong, Malcolm. Deals of Scale is Reinventing the Common Coupon. http://tech.co/deals-scale-reinventing-common-coupon-2014-02, Feb. 2, 2014 in 5 pages.

Goolook Face Platform. Smile Coupon. http://viv.co.jp/product/smile-coupon/ © 2015, in 7 pages.

Weiner Urban Hilton. The Best Social Media Campaigns of 2014. http://adbare.com/2014/12/11/the-best-social-media-campaigns-of-2014/, Dec. 11, 2014 in 4 pages.

Bhardia, Manish. Game on! Increasing Customer Engagement Through Gamification. LA Chamber Tech Thursday, presented Apr. 23, 2015, in 45 pages.

* cited by examiner

TRACKING NETWORK DATA PROPAGATION

RELATED APPLICATIONS

Any and all applications, if any, for which a foreign or domestic priority claim is identified in the Application Data Sheet of the present application are hereby incorporated by reference under 37 CFR 1.57.

BACKGROUND

This application relates to electronic communication between devices in a computer network.

BRIEF DESCRIPTION OF THE DRAWINGS

The drawings are provided to illustrate embodiments of the features described herein and not to limit the scope thereof.

DETAILED DESCRIPTION

This disclosure describes at least embodiments of a system for electronically generating data (for example, individualized data items) and tracking propagation of the data across a network of devices (for example, within a computer network) using computational analysis of communication activity. The network of devices can include, for instance, a network of one or more servers, end user computing devices, telecommunications infrastructure, and the like, or a subpart thereof. The system can electronically generate, using electronic hardware, generate data items having a variable quantity associated with them that depends at least on a predetermined quantity of those data items as specified by one or more devices in the network of devices, and which may vary based on electronic communication activities of one or more devices within the network of devices. An individual data item may include a data structure or data representation and may be electronically transmitted within the network. An individual data item can be provided by a device to a terminal that is able to electronically read such data items, and the terminal may then communicate over the network of devices based on the data item, or optionally, with an internal network separate from the network device, to effectuate application of the data item to a computation on an activity performed at the terminal.

Figure 1:
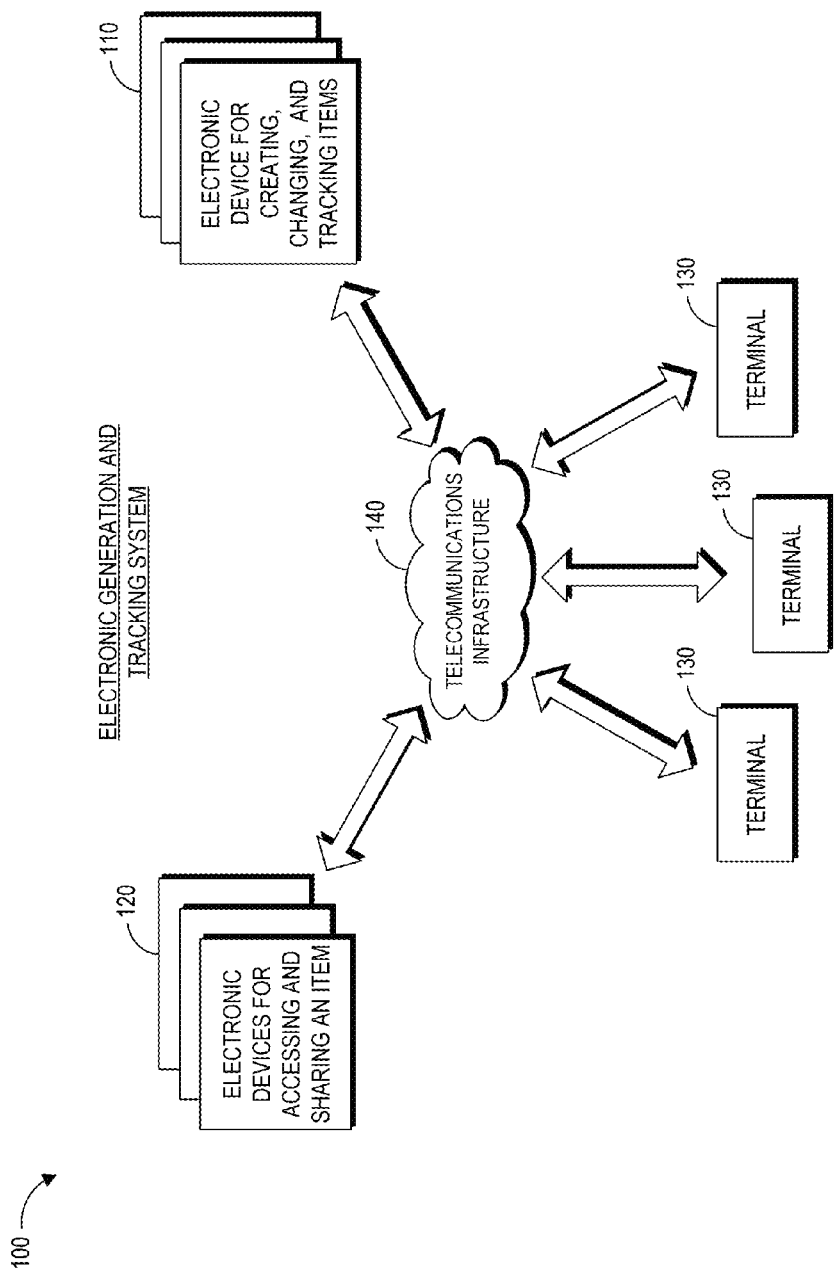
FIG. 1 illustrates an example system for electronically generating data and tracking propagation of the data across a network of devices.

FIG. 1 illustrates an example system 100 for electronically generating data, such as individualized data items, and tracking propagation of the data across a network of devices, such as a computer network, using computational analysis of communication activity. The system 100 includes one or more manager electronic devices 110 (sometimes referred to as monitoring devices) for creating, changing, and tracking data items as well as one or more propagating electronic devices 120 for accessing and sharing the data items. The system 100 may also include terminals 130 (sometimes referred to as monitoring devices) that can access the data items. The various devices shown to interact over a telecommunications infrastructure 140, which may be or include a computer network (e.g., a local-area network (LAN), a wide-area network (WAN), the Internet, an Intranet, combinations of the same, or the like). The data items can be shared electronically via the telecommunications infrastructure 140 and can be made to be physical, tangible data items, such as when printed by a printer. The manager electronic devices 110 for creating, changing, and tracking data items can include one or more servers, data storage units, or other computing devices including one or more hardware processors, memory, and instructions stored in a memory that can implement functionality for creating, changing, and tracking the data items. Likewise, the propagating electronic devices 120 accessing and sharing the data item or data items can include any computing device, including one or more hardware processors, memory, and instructions for accessing and sharing a data item. For instance, by way of example, the propagating electronic devices 120 can include desktop computers, laptops, tablets, cell phones, smartphones, electronic readers, kiosks, televisions, audiovisual (A/V) receivers, kiosks, combinations of the same, and the like.

The system 100 can be implemented to incentivize the propagation of data items across the telecommunications infrastructure 140 among the propagating electronic devices 120. The communication of the data items by the propagating electronic devices 120 can be tracked in such a way to reward for communicating the data items by the propagating electronic devices 120 and thereby increase the number of the propagating electronic devices 120 which have received the data items and the prevalence of the data items across the network.

One or more of the manager electronic devices 110 can provide instructions for constructing a data item or for tracking electronic communication of a data item over the telecommunications infrastructure 140. In some implementations, an instruction can provide initialization information both for constructing a data item and for tracking electronic communication of the data item over the telecommunications infrastructure 140. For instance, one instruction can (i) provide one or more of a tracking value (e.g., a zero or non-zero starting value), adjustment value, and threshold value that are associated with a data item and (ii) indicate how to track the communication of the data item by the propagating electronic devices 120 via one or more of a tracking value, adjustment value, and threshold value. Once a data item is generated, the data item or an electronic reference thereto (e.g., a unique link address within a computer network to a content page like a webpage) can be provided to (e.g., via email, text, messenger, photo) one or more of the propagating electronic devices 120, and one or more the propagating electronic devices 120 can begin sharing the data item or an electronic reference thereto to increase the number of propagating electronic devices 120 that have received the data item. In some embodiments, one or more of the data items described herein can be a coupon usable for obtaining a discount on the procurement of a good or service or some other reward.

The propagating electronic devices 120 can provide notifications via the telecommunications infrastructure 140 to one or more of the manager electronic devices 110 when the propagating electronic devices 120 devices transmit or receive a data item. In some implementations, the manager electronic devices 110 and the terminals 130 may not communicate notifications when the propagating electronic devices 120 devices communicate or receive a data item.

One or more of the manager electronic devices 110 can track that a data item has been transmitted or received based at least on the notifications. For example, the receipt of a notification can be tracked by one or more of the manager electronic devices 110 by initiating a computational analysis for tracking one or more of (i) how the data item was communicated, (ii) between which of the propagating electronic devices 120 the data item was communicated, (iii) which of the propagating electronic devices 120 provided a notification regarding communication of the data item, (iv) which of the propagating electronic devices 120 initiated the communication of the data item (e.g., via a user input like providing a unique identifier for one of the propagating electronic devices 120 to cause sharing of the data item with that electronic device), and (v) whether a communicating propagating electronic device 120 communicated the data item after receiving the data item from another one of the propagating electronic devices 120 such as from a series of different propagating electronic devices 120.

In some implementations, one or more of the manager electronic devices 110 can track the communication of a particular data item using a tracking value, adjustment value, and threshold value associated with the data item. One or more of the manager electronic devices 110 can store in a memory the adjustment value and threshold value and separately store the tracking value for each individual propagating electronic device 120. When a notification of communication of a particular data item by a particular propagating electronic device 120 is received, one of the manager electronic devices 110 can retrieve (i) the tracking value associated with the particular propagating electronic device 120 and particular data item and (ii) the adjustment value and threshold value associated with the particular data item. Then, the one of the manager electronic devices 110 can adjust the tracking value in the memory based at least on the adjustment value and threshold value. For instance, the tracking value can be increased by an amount depending on the adjustment value (e.g., increased proportionally based on the adjustment value like by 10%, 50%, 100%, or 200%) as a result of receipt of a notification, and the tracking value may be increased until the tracking value has reached the threshold value after which point the tracking value may not be further increased.

One or more of the propagating electronic devices 120 or one or more of the terminals 130 can communicate a status query to one or more of the manager electronic devices 110 to request information about communication of a data item by one or more of the propagating electronic devices 120. For example, one of the propagating electronic devices 120 or one of the terminals 130 can communicate a status query requesting information about the computational analysis for tracking for one of the propagating electronic devices 120, such as the tracking value in some implementations. In response to the status query, one or more of the manager electronic devices 110 can respond with the requested information about communication of a data item by one or more of the propagating electronic devices 120, such with the tracking value in some implementations.

One or more of the terminals 130 can communicate a tracking command to one or more of the manager electronic devices 110. The tracking command can specify a particular propagating electronic device 120 and a particular data item. In response to receiving the tracking command, the receiving manager electronic device 110 can adjust the computational analysis for tracking a particular propagating electronic device 120. For example, the receiving manager electronic device 110 can decrease the tracking value (e.g., to an initial value provided by an instruction for constructing or tracking a data item) associated with the particular propagating electronic device 120 and particular data item specified in the tracking command. In another example, the receiving manager electronic device 110 can change a tracking mode associated with the particular propagating electronic device 120 and particular data item specified in the tracking command so that notifications that are subsequently received by one or more of the electronic devices do not cause the tracking value associated with the particular propagating electronic device 120 and particular data item specified in the tracking command to further increase.

In some implementations, the computational analysis for tracking sharing of a particular data item by a particular propagating electronic device 120 can also be influenced by past communications of one or more different data items by the particular propagating electronic device 120. The propagating electronic devices 120 that have previously shared one or more different data items can, for instance, be rewarded for the past sharing by using a more favorable computational analysis for tracking communication of newly shared data item. For example, if a particular propagating electronic device 120 shared a first data item multiple times, the particular propagating electronic device 120 can receive an increased tracking value, adjustment value, or threshold value used for tracking the sharing of a second data item by the particular propagating electronic device 120.

In some implementations, the computational analysis for tracking sharing of a particular data item by a particular propagating electronic device 120 can also be influenced by whether the notification of a sharing was received by one or more manager electronic devices 110 from a transmitting propagating electronic device 120 or a receiving propagating electronic device 120. Because notifications from receiving propagating electronic devices 120 can be more valuable or credible than notifications from transmitting propagating electronic devices 120, the notifications from receiving propagating electronic devices 120 can have a greater impact on the tracking of sharing than when then the notifications are received from transmitting propagating electronic devices 120. Moreover, in certain embodiments, when the manager electronic devices 110 manage at least part of data item related activities using a registration system, the propagating electronic devices 120 associated with registered users may receive sharing credit (e.g., by increasing the associated tracking value) when notifications of sharing are received from either the transmitting propagating electronic devices 120 or the receiving propagating electronic devices 120; however, the propagating electronic devices 120 associated with unregistered users may receive sharing credit (e.g., by increasing the associated tracking value) when notifications of sharing are received from the receiving propagating electronic devices 120 but not from the transmitting propagating electronic devices 120.

In one example system, the computational analysis for tracking sharing of data items by the electronic devices can be associated with incentivizing behavior by users of the electronic devices. For instance, the computational analysis for tracking sharing of data items can be associated with a variable discount usable for the procurement of tangible or intangible items or rewards. The variable discount can be, over and above a face-value discount, or an all variable discount, which discount can be based on contingencies being met by the sharing. The contingencies may be based on a level or number of acceptances of the shared data items, a time limit, or to a geographic region or area in which the propagating electronic devices 120 reside. The strength of electronic device users' social networks can be used to distribute the data items and create an incentive to distribute the information.

In one example system, the system includes a web server that can include software and/or hardware configured to generate dynamically varying data items. Various vendor systems are shown in communication with the web server. The vendor systems can request creation of a dynamically-varying data items from the server, which may return data representing a dynamically-varying data item to the vendor systems. The vendor systems may then output or otherwise provide the data item to their customers or potential customers. The data item may be an electronic or digital data item or may instead be a paper data item (e.g., once printed by a vendor to share with users or printed by users directly from a vendor web site, email, etc.). The electronic or digital data item may also be printed directly from a mobile device like a smartphone or tablet. For instance, a vendor may output the data item on its website so that customers can access the data item from the website. However, there are many other example distribution channels for distributing data items, including a store Quick Response (QR) code or other machine-readable code that can be accessed by a user device, vendor printouts, and so on.

The data items may have a discount value or other reward that may depend on device activity with respect to the data item. When a user of a device accesses a vendor's data item, the user can redeem the data item for the face value of the discount or other reward. However, if the user shares the data item with other users, the value of the discount or reward for the data item can change, for example, to provide the user with a bigger or better discount or reward. In an embodiment, the value of the discount or reward depends at least on the degree to which users share the data item with other users. Users may share the data item on social media sites, such as Facebook™ or Twitter™, email the data item, post the data item in a blog post or chat service, such as WhatsApp™ or Snapchat™, text, and so forth. A user's actions in sharing the data item in any manner can result in the digital data item web server receiving an indication that the sharing or acknowledgement has occurred and applying a greater discount or other reward to the data item.

Examples of rewards that a user can receive for redeeming data items and/or sharing data items include one or more of: (i) reduced cost or free services, such as free shipping or higher levels or service, (ii) buy one, get one free (BOGO) promotions for goods or services, (iii) additional status points within an online or social network, (iv) abilities to share discounts or rewards with other users, (v) ability to unlock or access data items, discounts, or rewards previously unavailable to the user, such as to access a data item at a greater than normal face value. In some implementations, a community or social network can be built at least in part around the communication of data items between users. Within such a community or social network, the reward of the additional status points in the community or social network may be viewed as experience points or status advancements for the user that can increase the user's reputation in the community or social network. The experience points or status advancements can further be used as an indication of past sharing by the user, which can be encouraged by enabling the users with a sufficient number of experience points or status advancements to generate data items having (i) a greater initial or maximum value of a discount or reward or (ii) modified share conditions or thresholds for obtaining discounts or rewards.

The discount of a data item may be partially variable or all-variable. A data item with a partially-variable discount can include a base or initial discount that varies based on a degree of sharing or other criteria described herein. A data item with an all-variable discount can start at a discount of 0 and then increase (e.g., to 1%, 5%, 10%, etc. or other values) based on a degree of sharing or other criteria described herein. Although percentage values are used in this example to represent the discount value, the discount value may be represented in other ways than percentages, such as by actual values, number of free goods available with purchase, or the like.

In an embodiment, users obtain access to the data item by selecting the data item through a channel (e.g., web, text, email, etc.) provided by a vendor or by visiting the website or mobile application provided by the digital data item web server or another source, such as an application store (e.g., Google™ Play store or Apple™ App Store). For instance, an application store may provide a mobile application that has data items for multiple vendors. The digital data item can include a link or reference to a code at the digital data item web server that, when accessed by a user, can cause the digital data item web server to determine that the data item has been shared or otherwise acknowledged by user. In response to this determination, the digital data item web server can adjust the discount or reward associated with the data item for the user who shared the data item or for other users as well. The digital data item web server may, in some implementations, also issue a new data item to the user in response to the user accessing the link, so that the user can share that new data item with other users.

The number of times that the user shares that new data item (or the number of times that users in receipt of the new data item visits the link associated with the data item) can be tracked by the digital data item web server and used to further adjust the discount applied to that data item. In other embodiments, discounts or rewards to data items depend on a plurality of users sharing the data item or acknowledging a data item by visiting the link associated with the data item. Thus, for example, a data item's value may be the same for some or all users and may depend on the number of users that share the data item or otherwise access the link associated with the data item. Many different formulae may be used by the digital data item web server to calculate data item discount or reward changes.

User devices may download an application that can manage the digital data items they have accessed, allow them to access other digital data items, or allow them to redeem data items at vendor sites (brick and mortar stores or e-commerce sites). The application may be a mobile app provided by an application store, such as the Apple™ App Store or the Google™ Play store. Alternatively, the application can be a web application accessible through a browser in the user device. The application can include features for sharing data items with other users, tracking changing discounts or rewards for a user's data items, and optionally outputting a data item on a display so that it may be accessed by a vendor terminal to be applied to reduce or eliminate a payment. The application may be considered a digital wallet or to have at least some features of a digital wallet. Generally, a user device incorporating the application may also be considered to be a digital wallet or considered to have at least some features of a digital wallet. Moreover, in some embodiments, the application can be part of or communicate with a digital wallet, such as Apple™ Pay or Google™

Wallet, and discounts or rewards from possessing or sharing the data items can be managed, received, or redeemed through this digital wallet.

FIGS. 2 through 6 depict example processes they can be implemented by any of the systems described herein, including the systems of FIG. 1. It should be understood that any hardware or software may be used to implement these processes, and the processes are not limited to the particular arrangement of components shown and described with respect to FIG. 1.

Figure 2:
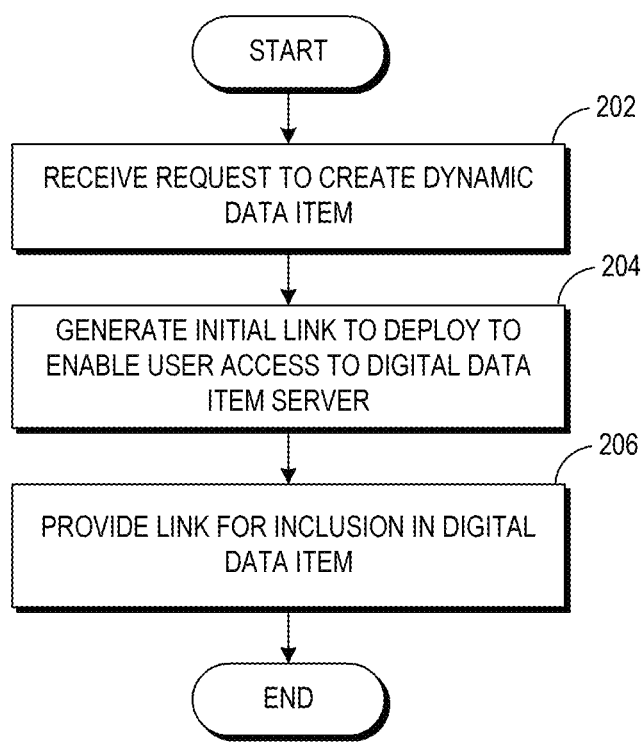
FIG. 2 depicts an example process for data item creation.

In particular, FIG. 2 depicts an example process 200 for electronic data item creation. For example, the process 200 may be used to create a dynamic data item and may be implemented by the digital data item web server. The process 200 starts by receiving a request from a vendor to create a dynamic data item at block 202. The request may come through the website provided by the digital data item web server and may come from a user device operated by a vendor. For instance, a company such as McDonald'S™ may access the digital data item web server (e.g., via a browser or other application) to request creation of a dynamic data item. The vendor can specify parameters for the data item, including an initial discount, a maximum change to the discount possible, other eligible rewards, and so forth. If the maximum change allowed is specified, regardless of the number of shares made of that data item, in one embodiment, the discount is not allowed to exceed the maximum change plus the initial discount. In other embodiments, the discount may keep growing if there are numerous additional shares or acknowledgements.

The digital data item web server can then generate an initial link to deploy to the vendor to enable a subsequent user access to the digital data item web server at block 204. This link may be provided at block 206 as part of a digital data item (e.g., in an image of the data item or link associated with the data item) on a vendor site or on a website or mobile application provided by the digital data item web server. The link may also be distributed in other ways, such as via email, text, blog posts, or the like.

Figure 3:
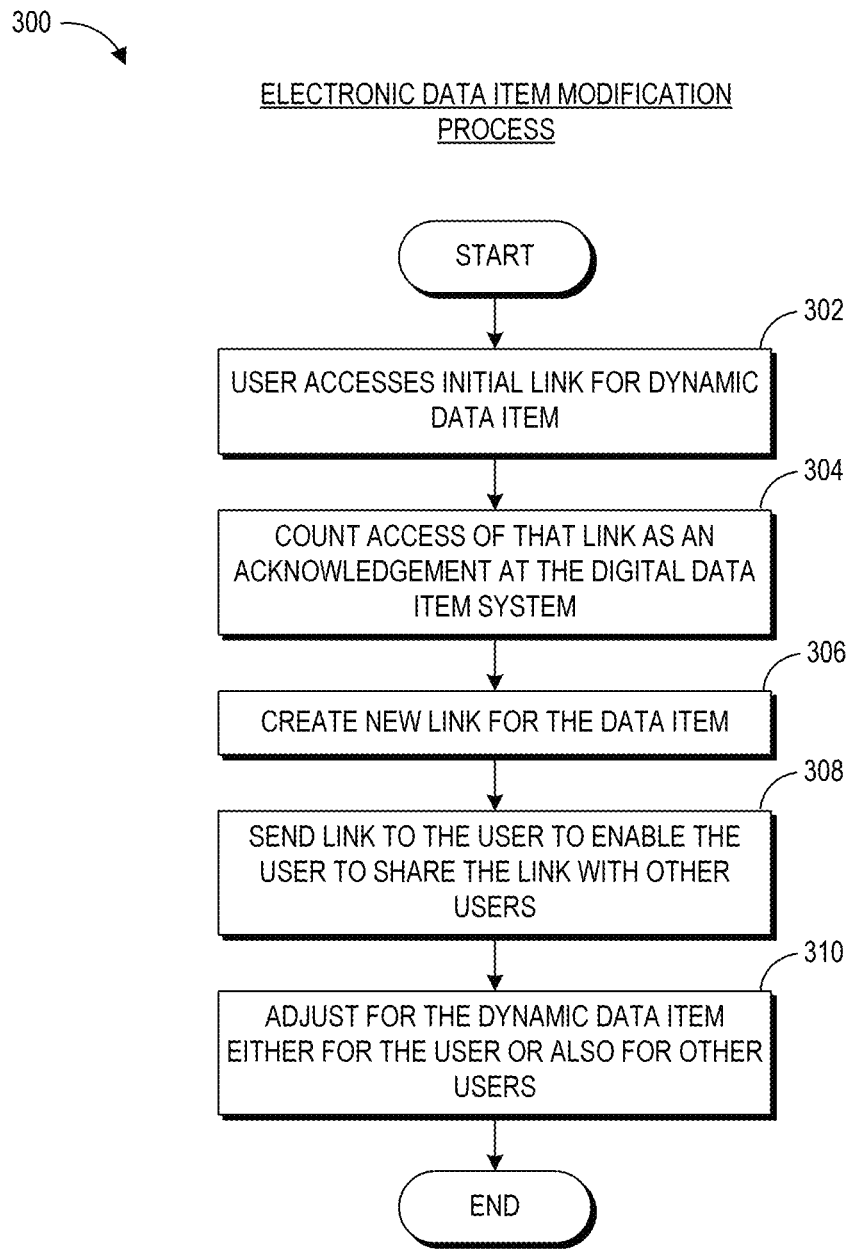
FIG. 3 illustrates an example process for data item modification.

With respect to FIG. 3, an example process 300 for electronic data item modification is shown. The process 300 may be used to modify a value of the digital data item created with respect to FIG. 2. Initially in the process 300, an end user accesses the initial link for the dynamic data item at block 302. Accessing the link can cause the user's computing device to access the digital data item web server, which can count the access of that link as an acknowledgment or share that may be used to adjust the discount or reward of the data item at block 304. Thereafter, at optional block 306, the digital data item web server can create a new link for the data item. At optional block 308, the digital data item web server can send the initial link, the new link, or even an entirely new data item including that link to the user to enable the user to share the link or new data item with other users. The digital data item web server may, at block 310, adjust a discount or reward for the dynamic data item either for that user or also for other users as well based on the fact that the user has shared or otherwise acknowledged selection of the data item.

In other embodiments, the digital data item system can track shares directly instead of or in addition to tracking acknowledgements. Shares can be tracked directly in different ways. For instance, a provider of the digital data item system can deploy a social media application (such as a Facebook™ application), which may be a plugin or stand-alone application that users can access from within or in connection with a social networking site. The users can choose to share a data item using one or more user interfaces provided by the social media application. The social media application can report to the digital data item web server that a share occurred so that the user who shared the data item may receive credit for this share (and ultimately a better discount or reward). In another embodiment, the digital data item web server can present a web page or pages that users can access to share data item, in which cases such users may also receive credit for shares. Whether by social media application or web page(s), the user interface(s) provided can include functionality for specifying which other users to share the data item with, for example, by inputting social networking user names or other contact information of those other users (such as email addresses or phone numbers).

The value of a discount or reward adjustment may depend on the type of user activity with respect to distributing the data items, such as whether the discount or reward adjustment is based on a share or an acknowledgement. In an embodiment, a greater discount or reward adjustment value is provided when a data item is acknowledged as being received as opposed to just being shared, as the acknowledgment may be greater evidence that an interested person has accessed the data item. However, in other embodiments, shares are rewarded with a greater discount or reward value than acknowledgements (e.g., to promote more users to share data items). In addition, the value of a discount or reward adjustment can increase when a user provides personalized information as part of sharing the data item. For example, the value of a discount or reward adjustment can increase when the user provides a written or video testimonial or a photograph like a self-portrait (sometimes referred to as a selfie) with the shared data item.

Figure 4:
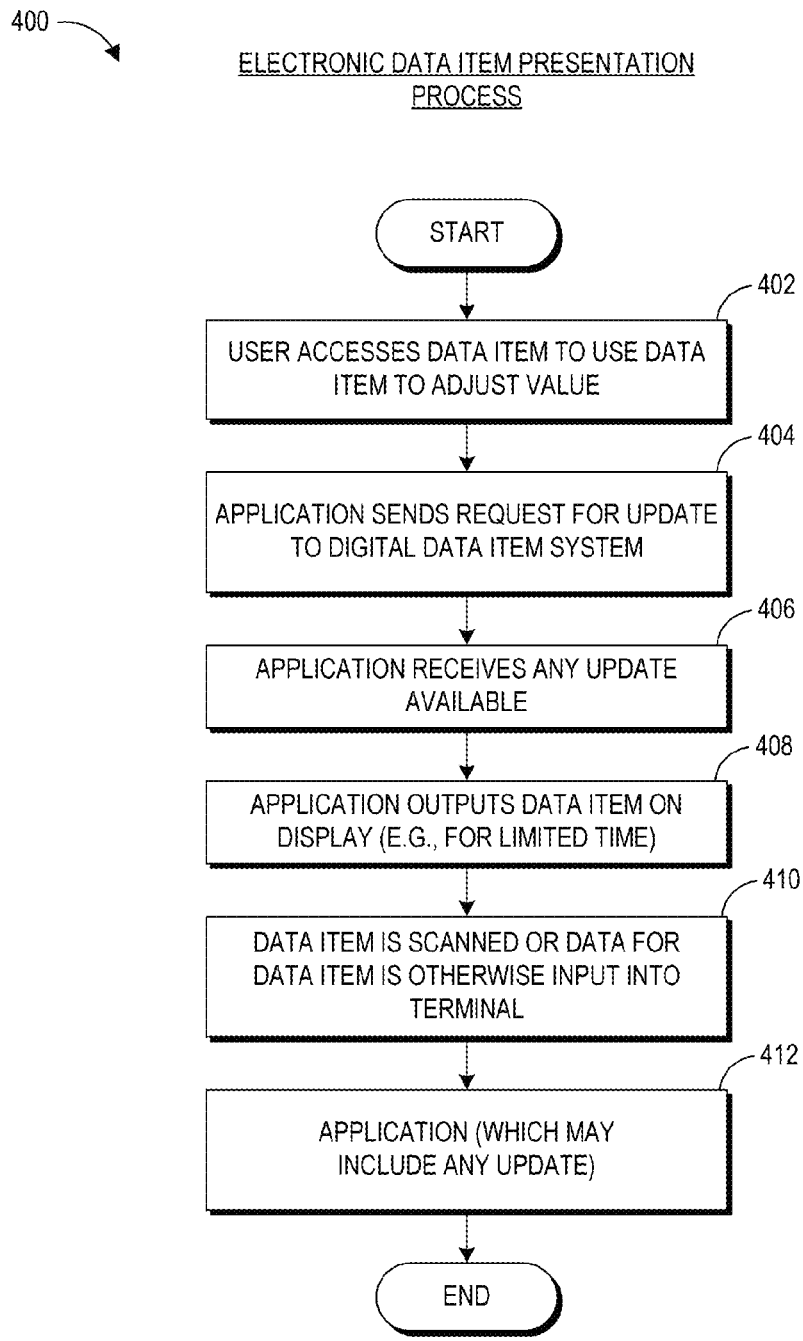
FIG. 4 depicts an example data item presentation process.

Turning to FIG. 4, an example electronic item presentation process 400 is shown. This process 400 may be implemented by a user device that includes an application or access to a webpage for managing digital data items. The process 400 can begin by a user accessing a data item from the application or webpage to apply the data item toward the payment to reduce or eliminate the payment or receive a reward at block 402. For instance, the user may select a data item from the application or webpage, which causes the application or application to output the data item or data representing the data item on a display of the user device. Prior to this outputting, the application or webpage can send a request for a discount or reward update to the digital data item system at block 404. The value of the data item may change dynamically even when the user is not actively sharing the data item in one embodiment because other users may be sharing the data item, which may change the value of the data item. Thus, the application can receive any discount or reward update that may be available at block 406. Further, the application or webpage may provide push notifications to a user device to indicate that the discount or reward for the data item has changed. These notifications may occur once a day or at any other frequency, or at any time when a discount or reward changes. A web interface may be provided by the digital data item web server that the user can access to log in and identify current values of discounts or rewards of any data items of the user has access to. In some embodiments, communication, generation, or management of the data items can be performed by affiliate systems separate from the digital data item system. For example, the affiliate systems can generate or provide web page links to users that facilitate sharing of data items between the users. In some embodiments, the data items can include bar codes so as to facilitate handling and tracking of the data items.

The application may then output the data item on a display at block 408. This output may (but need not) be for a limited time, such as a few seconds, or 30 seconds, or a few minutes, or the like so that the data item may be used once and then be deleted or otherwise deactivated from further use by that user or user device. Data items may be used multiple times depending on vendor preference. Once a user selects a data item for redemption, whether using the application, a printed version of the data item, or a webpage provided by the system, the data item may optionally include some indicia that redemption is occurring or about to occur, such as the words "Redeem Mode" or the like on the data item. The user may present the user device to a vendor for scanning a vendor terminal or by the vendor's user device at block 410. The vendor can apply any discount (which may include any discount update) to a payment of a transaction between the user and the vendor at block 412. The transaction may be for any type of good or service, including tangible goods and services or electronic goods and services.

Figure 5:
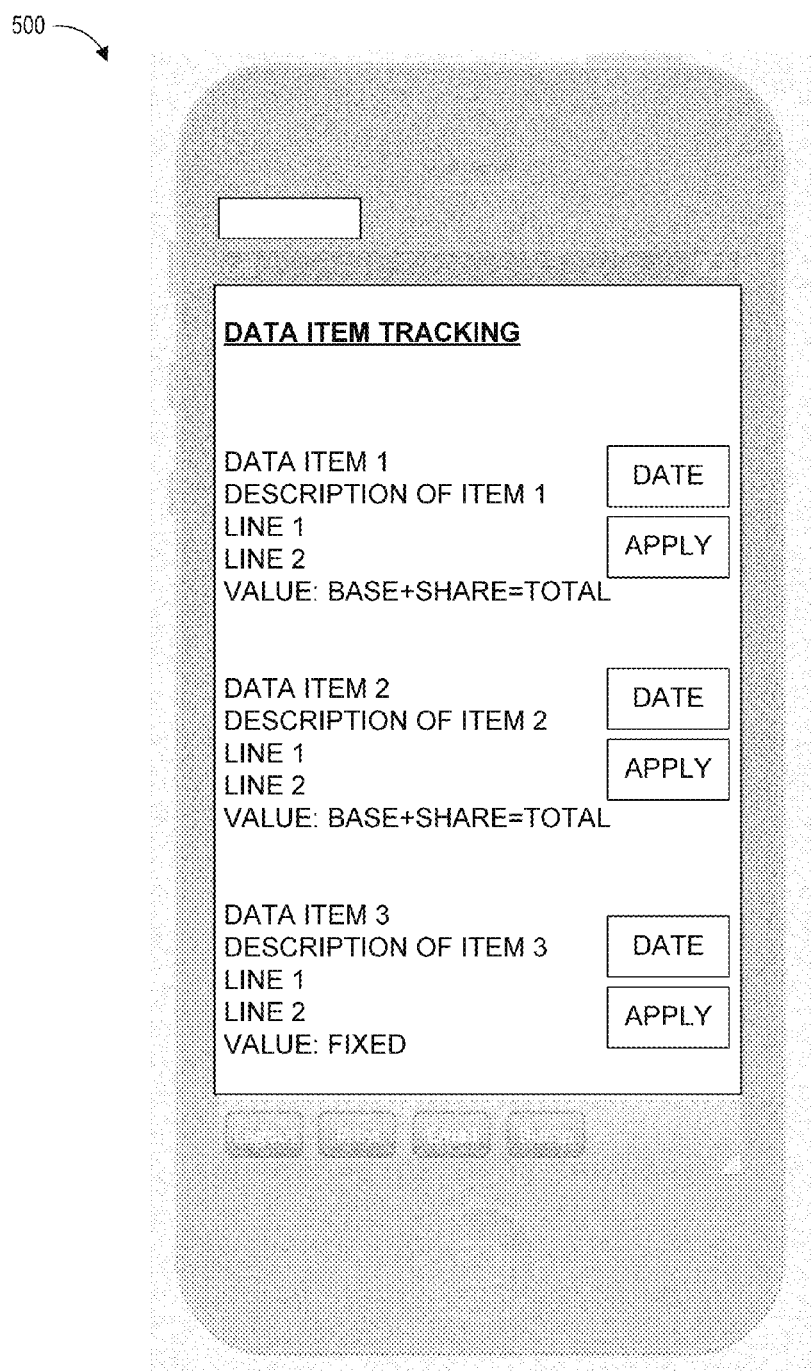
FIG. 5 depicts an example user device or electronic device showing a user interface of an application that may be installed on the user device.

FIG. 5 depicts an example user device 500 or electronic device showing a user interface 500 of an application that may be installed on the user device. In the example shown, the user device is a phone, and the user interface is output by a mobile application installed thereon. The mobile application user interface displays three types of example data items, as well as information about the data items, such as a description of each data item, the value of each data item (including the base or initial discount value plus any share bonus and the total discount), the date (e.g., expiration date), and so forth. Also shown are buttons to apply (e.g., redeem) a data item at a vendor terminal. Buttons for accessing Facebook™ and Twitter™ for sharing data items are also shown. Options for printing, emailing, and bumping another device (e.g., bringing a device in close or actual contact and communicating using near-field communications (NFC)) to share data items are also shown. A search box (not illustrated) can also be provided for searching a user's collection of data items. Although not shown, an all-variable discount data item type described above may also be included in the application in some embodiments, or fewer than all of the data item types shown may be used.

The user interface includes one or more user interface controls that can be selected by a user, for example, using a browser or other application software. Thus, the user interface shown may be output for presentation by the application, which may optionally include a browser or any other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options. Although each of these user interfaces are shown implemented in a mobile device, the user interfaces or similar user interfaces can be output by any computing device, examples of which are described above. The user interfaces described herein may be graphical user interfaces generated electronically by the application.

Figure 6:
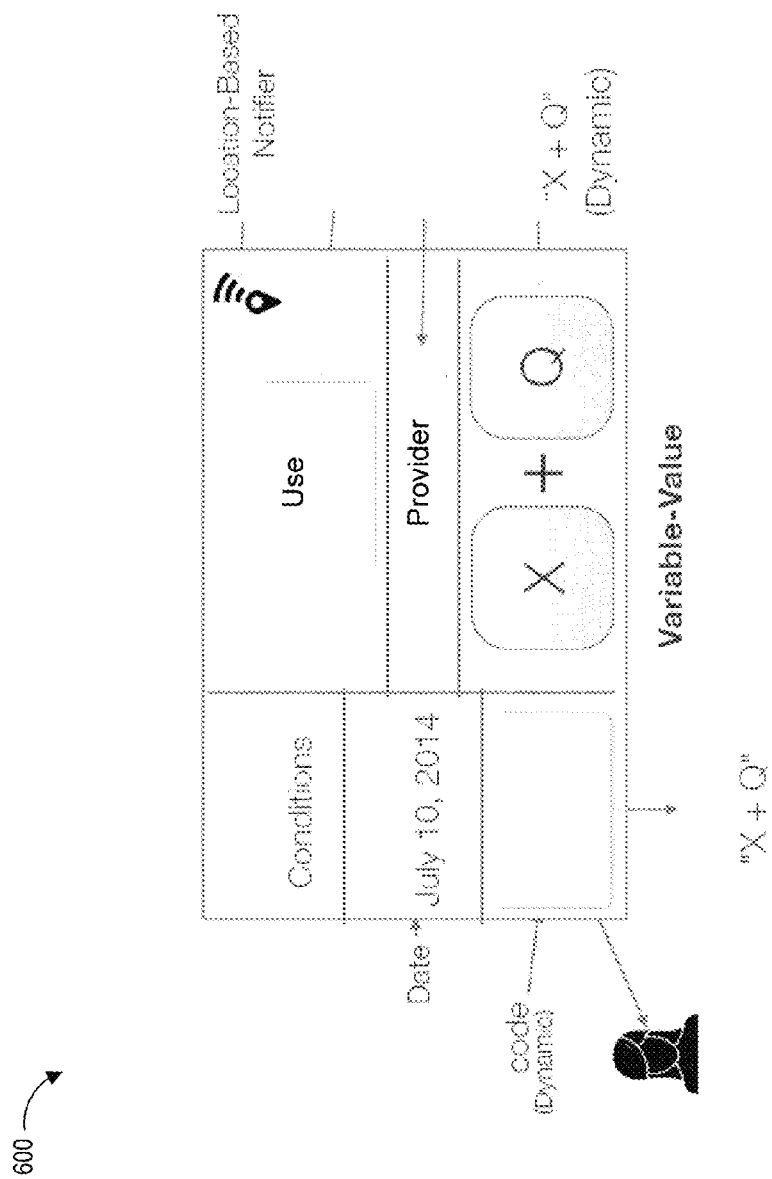
FIG. 6 shows an example data item with a variable-value.

FIG. 6 shows an example digital data item 600, including a variable-value or dynamic data item. The data item 600 can identify a provider (e.g., retailer), use (e.g., for a specific product or service), conditions (e.g., terms and conditions), and date (e.g., expiration date). The data item 600 also can include an indication of a discount or reward. The discount or reward can dynamic and depend on the sharing or acknowledgment features described herein. The data item 600 can include a code (e.g., barcode or other machine-readable code like a QR code). However, the code associated with the variable value data item can be a dynamic code that includes data representing the discount or reward as well as optionally a unique social media identifier of the user who receives this data item via sharing another similar data item with others. When this data item is shared, the user having the social media identifier (or any other identifier) can receive credit for the additional share by virtue of the user's unique social media identifier being associated with the data item. Other configurations are also possible.

Through a registration process, users may register an account with the digital data item system and may download an application that accesses account information for that user. As described above, this application (or a device embodying the application) can act as a digital wallet with various beneficial features described herein. For instance, registered users can share data items with registered or unregistered users and may use the application as a digital wallet that can present data items to a vendor in a redemption process. However, users need not be registered or have an account with the digital data item system in order to use some or all of the features described herein. To promote rapid adoption of variable data items without requiring users to register and download a mobile application, unregistered users may also access the features of the digital data item system in various ways.

Unregistered users may receive data items by accessing data items in print or on a website, as described above. Unregistered users may share data items with or from other unregistered or registered users. An unregistered user may share or acknowledge a data item without having to be a registered user, for example, by accessing a webpage or pages provided by the discount or reward data item system or a social media application with similar functionality (examples of which are described above). In an embodiment, unregistered users can receive credit for acknowledgments of data items rather than shares of data items, although shares may be tracked for unregistered users in other embodiments. Unregistered users may redeem a data item by accessing a webpage and inputting a code associated with the data item to receive a current discount or reward for that data item. Such users may therefore need to memorize or otherwise keep track of an identifier of a data item (which may be a number, name, or the like) in order to redeem the data item. Registered users need not manually keep track of the data item identifier in some embodiments because the application may do so for them.

The digital data item system may provide functionality for unregistered users (and optionally registered users) to create a password or personal identification number (PIN) to use when redeeming data items so that others do not redeem their data items. Data item numbers may also be generated randomly or at least not intentionally sequentially so that other users may not guess and improperly redeem a user's data items.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a hardware processor or digital logic circuitry, which may be or include a hardware processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A hardware processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:
1. A method of tracking electronic communications via a computer network between a plurality of interconnected propagating devices, the method comprising:
under control of a physical computing device comprising digital logic circuitry:

generating first data to be propagated via a computer network between a plurality of propagating devices, each of the plurality of propagating devices being configured to communicate the first data to one or more other of the plurality of propagating devices;

initializing in a memory a tracking value to a first value, an adjustment value to a second value, and a threshold value to a third value according to an initialization instruction provided by a first monitoring device of a plurality of monitoring devices via the computer network, the first data being associated in the memory with the tracking value, the adjustment value, and the threshold value, the plurality of monitoring devices being different from the plurality of propagating devices;

receiving a plurality of first notifications via the computer network from at least one of the plurality of propagating devices, each of the plurality of first notifications indicating that a first propagating device of the plurality of propagating devices communicated the first data via the computer network to at least one other propagating device of the plurality of propagating devices in response to at least one user operation by a user of the first propagating device, wherein the plurality of first notifications are not received via the computer network from the plurality of monitoring devices;

in response to receiving each of at least some of the plurality of first notifications,
 retrieving from the memory the tracking value and the threshold value,
 determining whether the tracking value has reached the threshold value,
 in response to determining that the tracking value has not reached the threshold value, increasing the tracking value in the memory based at least on the adjustment value, and
 in response to determining that the tracking value has reached the threshold value, maintaining the tracking value in the memory unchanged;

communicating to a second monitoring device of the plurality of monitoring devices via the computer network the tracking value for presentation on a display to a user of the second monitoring device in response to a status query from the second monitoring device via the computer network, the status query requesting the tracking value; and in response to receiving a tracking command from one of the plurality of monitoring devices via the computer network, either (i) decreasing the tracking value or (ii) changing a tracking mode for the first propagating device so that each of the plurality of first notifications that are subsequently received are processed without causing the tracking value in the memory to increase, the tracking command identifying the first propagating device.

2. The method of claim 1, further comprising:
under control of the physical computing device:
 generating second data to be propagated via the computer network between the plurality of propagating devices, the second data being different from the first data;
 receiving a plurality of second notifications via the computer network from at least one of the plurality of propagating devices, each of the plurality of second notifications indicating that the first propagating device communicated the second data via the computer network to at least one other propagating device of the plurality of propagating devices in response to at least one user operation by the user of the first propagating device; and
 in response to determining that the first propagating device communicated the second data to at least one other propagating device of the plurality of propagating devices prior to communicating the first data to at least one other propagating device of the plurality of propagating devices, changing in the memory at least one of the tracking value, the adjustment value, and the threshold value.

3. The method of claim 2, further comprising:
under control of the physical computing device:
 receiving a plurality of second notifications via the computer network from at least one of the plurality of propagating devices, each of the plurality of second notifications indicating that a second propagating device of the plurality of propagating devices communicated the first data via the computer network to at least one other propagating device of the plurality of propagating devices in response to at least one user operation by a user of the second propagating device, the second propagating device being different from the first propagating device and being one of the at least one other propagating device to which the first propagating device communicated the first data; and
 in response to receiving each of at least some of the plurality of second notifications,
  retrieving from the memory the tracking value and the threshold value,
  determining whether the tracking value has reached the threshold value,
  in response to determining that the tracking value has not reached the threshold value, increasing the tracking value in the memory based at least on the adjustment value, and
  in response to determining that the tracking value has reached the threshold value, maintaining the tracking value in the memory unchanged.

4. The method of claim 3, further comprising:
under control of the physical computing device:
 receiving at least one of the plurality of first notifications via the computer network from the first propagating device.

5. The method of claim 4, further comprising:
under control of the physical computing device:
 receiving at least one of the plurality of first notifications via the computer network from the at least one other propagating device to which the first propagating device communicated the first data.

6. The method of claim 5, wherein the at least one user operation by the user of the first propagating device comprises an input of identifying information indicative of the second propagating device and causes the first propagating device to communicate the first data via the computer network to the second propagating device.

7. The method of claim 6, further comprising:
under control of the physical computing device:
 in response to determining that one of the plurality of first notifications is received from the first propagating device, increasing the tracking value in the memory by a first amount based at least on the adjustment value in response to determining that the tracking value has not reached the threshold value; and in response to determining that one of the plurality of first notifications is received from the at least one other propagating device to which the first propagating device communicated the first data, increasing the tracking value in the memory by a second amount based at least on the adjustment value in response to determining that the tracking value has not reached the threshold value, the second amount being greater than the first amount.

8. The method of claim 7, further comprising:
under control of the physical computing device:
   in response to (i) determining that the user of the first propagating device is an unregistered user and (ii) receiving one of the plurality of first notifications from the first propagating device, maintaining the tracking value in the memory unchanged;
   in response to (i) determining that the user of the first propagating device is the unregistered user and (ii) receiving one of the plurality of first notifications from the at least one other propagating device to which the first propagating device communicated the first data,
     increasing the tracking value in the memory based at least on the adjustment value in response to determining that the tracking value has not reached the threshold value, and
     maintaining the tracking value in the memory unchanged in response to determining that the tracking value has reached the threshold value; and
   in response to (i) determining that the user of the first propagating device is a registered user and (ii) receiving one of the plurality of first notifications from either the first propagating device or the at least one other propagating device to which the first propagating device communicated the first data,
     increasing the tracking value in the memory based at least on the adjustment value in response to determining that the tracking value has not reached the threshold value, and
     maintaining the tracking value in the memory unchanged in response to determining that the tracking value has reached the threshold value.

9. The method of claim 8, further comprising:
under control of the physical computing device:
   storing the first data to a content page accessible by the plurality of propagating devices via the computer network,
wherein at least one of the plurality of first notifications indicates that the first propagating device communicated a link to the content page via the computer network to the at least one other propagating device in response to the at least one user operation by the user of the first propagating device.

10. The method of claim 9, wherein the first value is a non-zero value.

11. The method of claim 8, wherein at least one of the plurality of first notifications indicates that the first propagating device communicated the first data in an email via the computer network to the at least one other propagating device in response to the at least one user operation by the user of the first propagating device.

12. The method of claim 6, further comprising:
under control of the physical computing device:
   increasing the tracking value in the memory by the adjustment value in response to determining that the tracking value has not reached the threshold value.

* * * * *